United States Patent [19]

O'Callaghan

[11] 4,042,201

[45] Aug. 16, 1977

[54] RADIO MOUNTING BRACKET

[75] Inventor: James S. O'Callaghan, Gilford, N.H.

[73] Assignee: Tram/Diamond Corporation, Winnisquam, N.H.

[21] Appl. No.: 709,228

[22] Filed: July 27, 1976

[51] Int. Cl.² .......................................... B60R 11/02
[52] U.S. Cl. ............................... 248/309 R; 211/192; 248/203; 292/87
[58] Field of Search ................. 248/300, 309 R, 317, 248/203, 200, 223, 225, 243; 211/192; 292/87

[56] References Cited

U.S. PATENT DOCUMENTS

| 3,055,462 | 9/1962 | Steele | 248/243 |
| 3,190,604 | 6/1962 | Jorgensen et al. | 248/317 |
| 3,410,122 | 11/1968 | Moses | 248/203 |

FOREIGN PATENT DOCUMENTS

| 1,135,711 | 12/1956 | France | 248/309 |
| 1,129,572 | 5/1962 | Germany | 248/309 |

Primary Examiner—Marion Parsons, Jr.
Attorney, Agent, or Firm—Thomas N. Tarrant

[57] ABSTRACT

A bracket for mounting mobile electronic equipment having L-shaped slots for receiving mounting studs attached to the equipment and wire spring elements across one or more of the slots for latching the studs into the "feet" of the L-shaped slots.

8 Claims, 3 Drawing Figures

RADIO MOUNTING BRACKET

BACKGROUND OF THE INVENTION

1. Field of the Invention

The present invention relates to brackets for removably securing mobile radio units and related equipment in place on car, boat, truck or other mobile carrier.

2. Description of the Prior Art

Nonfactory installed radio equipment is commonly mounted by a bracket installed under the instrument panel of a vehicle. Various devices and arrangements have been utilized to secure the equipment unit to the bracket. The most common are probably machine screws or screw threaded bolts with various heads or knobs for tightening and loosening. Key-locking arrangements and burglar alarm connections have also been devised to reduce theft. Brackets for ready removal and insertion have been provided with slide tracks and a flat spring latching member. For removal, the latching member must be elevated or depressed as the case may be.

SUMMARY OF THE INVENTION

Now, in accordance with the present invention, a mobile equipment support bracket is provided that releasably secures an equipment unit in L-shaped slots. A plurality of L-shaped slots receive studs projecting from the radio unit. The studs are supported in the bracket upon passing around the corner into the "foot" of the L. A wire spring secured by an eyelet at one end is positioned so that the other end blocks the "leg" of the L. When the studs of the radio unit are pressed up into the foot of the L, the spring is forced up and then snaps back securing the studs in place. Two or more slots may be used with up to as many springs as slots. The present invention provides easy and quick in-and-out mounting of a radio unit without risk of jamming in slide tracks or the need to operate a release lever or screw device.

Further objects and features of the invention will become apparent upon reading the following description together with the Drawing.

DESCRIPTION OF THE PREFERRED EMBODIMENT

A unit of equipment as described herein is a radio receiver, radio transmitter or transceiver for mobile use in a vehicle, tape player, recorder or other related electronic equipment for mounting in a vehicle.

A common way of installing such units is by fastening a U-shaped bracket to the vehicle by screws or nuts and bolts. The unit is then secured within the bracket by various and numerous fastening means. These fastening means are usually located at the uprights of the U-shaped bracket.

Figure 1:
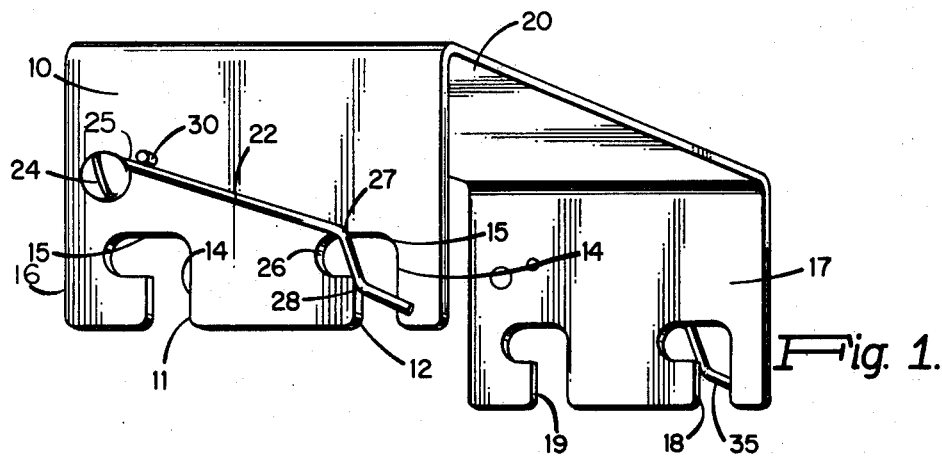
FIG. 1 is a left perspective view of a bracket according to the invention.
Figure 2:
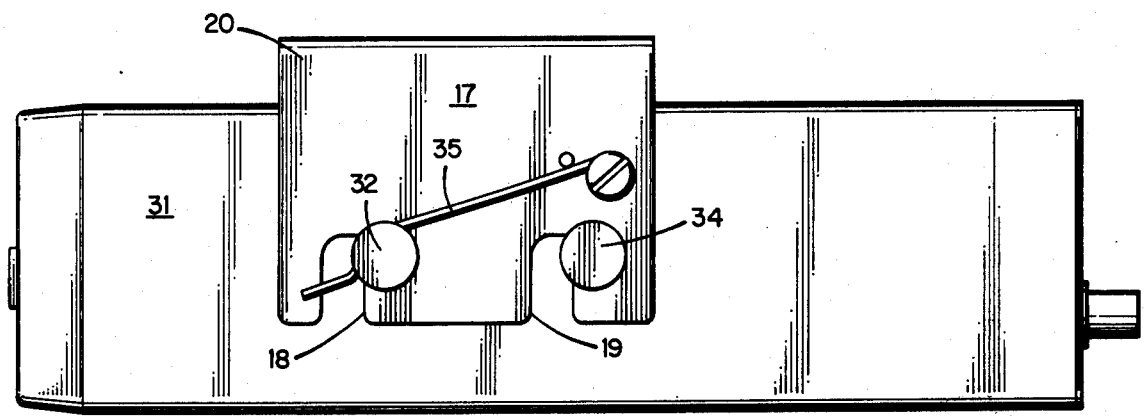
FIG. 2 is a right side elevation of the bracket of FIG. 1 supporting a radio unit.
Figure 3:
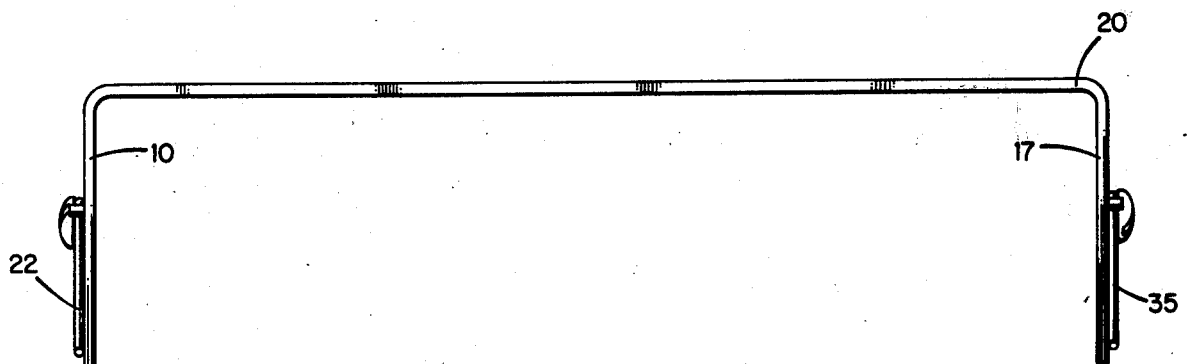
FIG. 3 is a front elevation of the bracket of FIG. 1.

Referring to FIG. 1, upright end 10 of such a bracket is depicted. Although they may be mounted in different positions, the most common way of mounting these brackets is with the uprights of the U-shape directed downward in an inverted U configuration. Thus, end 10 is directed downward and carries slots 11 and 12 directed upward from the bottom edge. Slots 11 and 12 each have an inverted L shape in which the leg 14 of the L is depicted vertical and foot 15 at the top of leg 14 is directed horizontally toward back 16 of bracket end 10. As depicted in FIG. 2, opposite bracket end 17 contains corresponding slots 18 and 19. FIG. 3 depicts bracket ends 10 and 17 connected in a U configuration to bracket 20.

Referring again to FIG. 1, spring 22 is mounted on end 10 by screw 24 positioned above inverted L shaped slot 11. Screw 24, depicted as a machine screw, can be a rivet or other fastening for securely clamping first end 25 of spring 22. End 25 of spring 22 is bent into an eyelet shape (not shown) under the head of screw 24. Spring 22 extends in a straight line past toe 26 of foot 15 in slot 12 at which point it is bent with two reversing bends. First bend 27 is at the top of slot 12, and second bend 28 is proximate the right angle formed by leg 14 and foot 15 of slot 12. Spring 22 then extends substantially parallel with its original line of direction from screw 24 to extend across leg 14 of slot 12.

A fixed pin 30 is secured in end 10 bearing against spring 22 just to the right of screw 24 to prevent counterclockwise rotation of spring 22 about screw 24.

Referring now to FIG. 2, a unit 31 of radio equipment is depicted mounted in bracket 20. The right side end 17 of bracket 20 is shown with studs 32 and 34 of unit 31 secured in slots 18 and 19 respectively. Spring 35, similar to spring 22, bears against stud 32 securing unit 31 against easy removal. Entire bracket 20 with ends 10 and 17 and springs 22 and 35 is depicted in FIG. 3. The radio equipment to be installed is mounted between the two ends 10 and 17.

Of particular significance is the angle in bend 27 as depicted in FIG. 1. This angle affects the leverage against spring 22. In moving a stud such as 32 into slot 12, there is considerable leverage determined by the distance from pin 30 acting as a fulcrum. The greater this distance is, the easier it is to force the spring upward. However, once a stud such as stud 32 has been latched into toe 26 of slot 12, there is a different leverage for removal. This new leverage is related to the angle of bend at bend 27. As that portion of spring 22 passing around the stud approaches a right angle to the portion of spring 22 extending from pin 30, the pressure required to move the stud back out of toe 26 becomes greater and greater. In this manner insertion of a radio unit can be made relatively easy and removal relatively difficult.

In an exemplary embodiment, wire 22 was music wire having a diameter of approximately 0.16 cm and an overall length excluding the eyelet of 6.5 cm. The length of spring 22 between bends 27 and 28 was approximately 1.5 cm and the length from the eyelet to bend 27 was 4.0 cm. Pin 30 was positioned 0.75 cm from the eyelet, and the eyelet was positioned 1.0 cm above foot 15 of slot 11. Bend 27 formed an angle of approximately 125° with the portion of spring 22 extending from end 25, and bend 28 bends spring 22 back with a similar angle.

In one contemplated variation, increased latching effect is achieved by curving that portion of spring 22 between bends 27 and 28. The curve would be designed to hook about the respective stud.

While the invention has been described with respect to a specific embodiment, obvious variations are contemplated, and it is intended to cover the invention within the scope of the appended claims.

I claim:

1. A bracket for mounting electronic equipment in a vehicle comprising:
   a. a U-shaped bracket having a first slot and a second slot in each upright of the U for receiving mounting studs attached to opposite sides of an equipment unit, each slot having an entrance at one end of an entrance leg and a foot formed substantially perpendicular to the other end of said leg so as to form an L shape;
   b. at least one wire spring element having an eyelet at a first end and a double bend at a second end secured to each upright of said bracket with said second end blocking said first slot; and,
   c. a pin mounted adjacent said first end to restrict rotation of said spring element, all whereby said spring element resists passage of equipment mounting studs into said first slot and then snaps behind it as it moves into the "foot" of the first slot to secure said equipment unit in place.

2. A bracket according to claim 1 wherein said spring is secured by said eyelet proximate said second slot.

3. A bracket according to claim 1 wherein said double bend comprises a first bend of substantially 125° with the preceding portion of said element extending from said eyelet and a second bend of substantially 125° with the following portion of said element at the end opposite said eyelet.

4. A bracket according to claim 3 wherein said first bend is displaced from said second bend by substantially the width of said foot.

5. A bracket according to claim 3 wherein said following portion of said element is substantially parallel with said preceding portion.

6. A bracket according to claim 1 wherein said element is made of music wire approximately 0.16 cm in diameter and 6.5 cm long.

7. A bracket according to claim 1 wherein said pin is located substantially 1.0 cm from said second slot in the direction of the closed part of said U-shaped bracket and is on the opposite side of said element from said second slot.

8. A bracket according to claim 1 wherein the "foot" of each slot ends in a "toe", said second end comprises a first element portion between the bends of said double bend and a second element portion following said double bend, said first element portion normally positioned to block the toe of said first slot and the second element portion normally positioned to block the entrance to said first slot.

* * * * *